United States Patent
Holstein et al.

(10) Patent No.: US 9,979,050 B2
(45) Date of Patent: May 22, 2018

(54) FLUORINATED ELECTROLYTE COMPOSITIONS

(75) Inventors: William L Holstein, Hockessin, DE (US); Xudong Chen, Hockessin, DE (US); Jun J Liu, Wilmington, DE (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 314 days.

(21) Appl. No.: 14/241,894

(22) PCT Filed: Aug. 31, 2012

(86) PCT No.: PCT/US2012/053415
§ 371 (c)(1),
(2), (4) Date: Feb. 28, 2014

(87) PCT Pub. No.: WO2013/033579
PCT Pub. Date: Mar. 7, 2013

(65) Prior Publication Data
US 2014/0227584 A1    Aug. 14, 2014

Related U.S. Application Data

(60) Provisional application No. 61/530,545, filed on Sep. 2, 2011.

(51) Int. Cl.
*H01M 10/05* (2010.01)
*H01M 10/0569* (2010.01)
*H01M 10/0525* (2010.01)
*H01M 10/0567* (2010.01)

(52) U.S. Cl.
CPC ... *H01M 10/0569* (2013.01); *H01M 10/0525* (2013.01); *H01M 10/0567* (2013.01)

(58) Field of Classification Search
CPC .................................................. H01M 10/056
See application file for complete search history.

(56) References Cited

U.S. PATENT DOCUMENTS

| | | | |
|---|---|---|---|
| 2,824,141 A | 2/1958 | Zisman et al. |
| 3,006,964 A | 10/1961 | Oesterling |
| 5,273,840 A | 12/1993 | Dominey |
| 5,352,548 A | 4/1994 | Fujimoto et al. |
| 5,446,134 A | 8/1995 | Armand et al. |
| 5,534,634 A | 7/1996 | Appel et al. |
| 5,561,232 A | 10/1996 | Hao et al. |
| 5,659,062 A | 8/1997 | Yokoyama et al. |

(Continued)

FOREIGN PATENT DOCUMENTS

| | | |
|---|---|---|
| CN | 101617432 A | 12/2009 |
| CN | 102790236 A | 11/2012 |

(Continued)

OTHER PUBLICATIONS

US 8,372,547, 02/2013, Koh et al. (withdrawn)

(Continued)

*Primary Examiner* — Jacob Marks
(74) *Attorney, Agent, or Firm* — Osha Liang LLP

(57) ABSTRACT

Electrolyte compositions containing a solvent mixture comprising 2,2,-difluoroethyl acetate and ethylene carbonate are described. The electrolyte compositions are useful in electrochemical cells, such as lithium ion batteries.

10 Claims, 3 Drawing Sheets

(56) References Cited

U.S. PATENT DOCUMENTS

| | | |
|---|---|---|
| 5,738,957 A | 4/1998 | Amine et al. |
| 5,847,156 A | 12/1998 | Eldin et al. |
| 5,847,188 A | 12/1998 | Yokoyama et al. |
| 5,925,283 A | 7/1999 | Taniuchi et al. |
| 5,962,166 A | 10/1999 | Ein-Eli et al. |
| 6,168,878 B1 | 1/2001 | Fauteux et al. |
| 6,337,158 B1 | 1/2002 | Nakajima et al. |
| 6,420,069 B2 | 7/2002 | Amine et al. |
| 6,465,135 B1 | 10/2002 | Nishimura et al. |
| 6,495,293 B1 | 12/2002 | Arai et al. |
| 6,506,516 B1 | 1/2003 | Wietelmann et al. |
| 6,506,524 B1 | 1/2003 | McMillan et al. |
| 6,534,220 B2 | 3/2003 | Garbe |
| 6,680,145 B2 | 1/2004 | Obrovac et al. |
| 6,723,473 B1 | 4/2004 | Oura et al. |
| 6,878,492 B2 | 4/2005 | Takeuchi et al. |
| 6,958,198 B2 | 10/2005 | Iwamoto et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,229,718 B2 | 6/2007 | Yamaguchi et al. |
| 7,303,840 B2 | 12/2007 | Thackeray et al. |
| 7,312,001 B2 | 12/2007 | Kim et al. |
| 7,381,496 B2 | 6/2008 | Onnerud et al. |
| 7,416,813 B2 | 8/2008 | Fujihara et al. |
| 7,468,223 B2 | 12/2008 | Thackeray et al. |
| 7,491,471 B2 | 2/2009 | Yamaguchi et al. |
| 7,541,114 B2 | 6/2009 | Ohzuku et al. |
| 7,635,536 B2 | 12/2009 | Johnson et al. |
| 7,718,319 B2 | 5/2010 | Manthiram et al. |
| 7,754,389 B2 | 7/2010 | Yamaguchi et al. |
| 7,790,308 B2 | 7/2010 | Johnson et al. |
| 7,981,544 B2 | 7/2011 | Morishima |
| 8,092,942 B1 | 1/2012 | Chen et al. |
| 8,097,368 B2 | 1/2012 | Chiga et al. |
| 8,158,285 B2 | 4/2012 | Im et al. |
| 8,178,246 B2 | 5/2012 | Shima |
| 8,216,726 B2 | 7/2012 | Wakita et al. |
| 8,277,973 B2 | 10/2012 | Kawashima |
| 8,288,039 B2 | 10/2012 | Im et al. |
| 8,367,254 B2 | 2/2013 | Im et al. |
| 8,372,549 B2 | 2/2013 | Im et al. |
| 8,389,160 B2 | 3/2013 | Venkatachalam et al. |
| 8,394,534 B2 | 3/2013 | Lopez et al. |
| 8,415,056 B2 | 4/2013 | Koh et al. |
| 8,435,680 B2 | 5/2013 | Park et al. |
| 8,455,143 B2 | 6/2013 | Lee et al. |
| 8,535,832 B2 | 7/2013 | Kandasamy et al. |
| 8,518,525 B2 | 8/2013 | Dennes et al. |
| 8,530,099 B2 | 9/2013 | Chen et al. |
| 8,546,024 B2 | 10/2013 | Jeon et al. |
| 8,557,447 B2 | 10/2013 | Lee |
| 8,586,245 B2 | 11/2013 | Yamaguchi et al. |
| 8,668,838 B2 | 3/2014 | Takahashi et al. |
| 8,673,506 B2 | 5/2014 | Jeon et al. |
| 8,715,852 B2 | 5/2014 | Kim et al. |
| 8,715,865 B2 | 5/2014 | Xu et al. |
| 8,735,005 B2 | 5/2014 | Holstein et al. |
| 8,795,903 B2 | 8/2014 | Smart et al. |
| 8,871,384 B2 | 10/2014 | Koh et al. |
| 8,877,389 B2 | 11/2014 | Koh et al. |
| 8,945,781 B2 | 2/2015 | Chiga et al. |
| 8,946,452 B2 | 2/2015 | Dietz et al. |
| 9,093,718 B2 | 7/2015 | Dietz et al. |
| 9,105,943 B2 | 8/2015 | Jeon et al. |
| 9,246,191 B2 | 1/2016 | Jeon et al. |
| 2003/0180618 A1 | 9/2003 | Inoue et al. |
| 2003/0190529 A1 | 10/2003 | Kim et al. |
| 2004/0157133 A1 | 8/2004 | Kim et al. |
| 2005/0196670 A1 | 9/2005 | Yamaguchi et al. |
| 2006/0051671 A1 | 3/2006 | Thackeray et al. |
| 2006/0115739 A1 | 6/2006 | Yamaguchi et al. |
| 2006/0147808 A1 | 7/2006 | Xiao et al. |
| 2006/0154149 A1 | 7/2006 | Arai et al. |
| 2006/0216612 A1 | 9/2006 | Jambunathan et al. |
| 2007/0042267 A1 | 2/2007 | Kim et al. |
| 2007/0148540 A1 | 6/2007 | Chiga et al. |
| 2007/0178379 A1 | 8/2007 | Tamura et al. |
| 2007/0190412 A1 | 8/2007 | Chiga et al. |
| 2007/0224504 A1 | 9/2007 | Kita et al. |
| 2007/0287071 A1 | 12/2007 | Chiga et al. |
| 2008/0102375 A1 | 5/2008 | Shima |
| 2008/0131772 A1 | 5/2008 | Jambunathan et al. |
| 2008/0145763 A1 | 6/2008 | Koh et al. |
| 2008/0292971 A1 | 11/2008 | Iharu et al. |
| 2009/0142663 A1 | 6/2009 | Takeuchi et al. |
| 2009/0253044 A1 | 10/2009 | Nogi et al. |
| 2009/0253048 A1 | 10/2009 | Shima |
| 2010/0035162 A1* | 2/2010 | Chiga ............... H01M 10/052 429/343 |
| 2010/0047695 A1 | 2/2010 | Smart et al. |
| 2010/0062344 A1 | 3/2010 | Koh et al. |
| 2010/0081062 A1 | 4/2010 | Chiga et al. |
| 2010/0108934 A1 | 5/2010 | Flynn et al. |
| 2010/0119956 A1 | 5/2010 | Tokuda et al. |
| 2010/0183926 A1 | 7/2010 | Kim et al. |
| 2010/0190055 A1 | 7/2010 | Khakhalev |
| 2010/0266904 A1 | 10/2010 | Jeon et al. |
| 2010/0266905 A1 | 10/2010 | Jeon et al. |
| 2010/0273064 A1 | 10/2010 | Jeon et al. |
| 2011/0008684 A1 | 1/2011 | Jeon et al. |
| 2011/0111305 A1 | 5/2011 | Jeon et al. |
| 2011/0111307 A1 | 5/2011 | Koh et al. |
| 2011/0123872 A1 | 5/2011 | Koh et al. |
| 2011/0143217 A1 | 6/2011 | Arora et al. |
| 2011/0171539 A1 | 7/2011 | Patoux et al. |
| 2011/0195317 A1 | 8/2011 | Koh et al. |
| 2011/0256458 A1 | 10/2011 | Tani |
| 2011/0311866 A1 | 12/2011 | Lim et al. |
| 2012/0009485 A1 | 1/2012 | Xu |
| 2012/0136175 A1 | 5/2012 | Fuseya et al. |
| 2012/0149852 A1 | 6/2012 | Dennes et al. |
| 2012/0164519 A1 | 6/2012 | Lee et al. |
| 2012/0164542 A1 | 6/2012 | Iwaya |
| 2012/0196190 A1 | 8/2012 | Jeon et al. |
| 2012/0208093 A1 | 8/2012 | Ihara et al. |
| 2012/0219866 A1 | 8/2012 | Onuki et al. |
| 2012/0301795 A1 | 11/2012 | Kaneko et al. |
| 2012/0321965 A1 | 12/2012 | Fujikawa et al. |
| 2012/0328938 A1 | 12/2012 | Geiculescu et al. |
| 2013/0029230 A1 | 1/2013 | Park et al. |
| 2013/0029231 A1 | 1/2013 | Jeon et al. |
| 2013/0149602 A1 | 6/2013 | Luski et al. |
| 2013/0189591 A1 | 7/2013 | Nishimura et al. |
| 2013/0309564 A1 | 11/2013 | Yoshida et al. |
| 2013/0337342 A1 | 12/2013 | Hallac et al. |
| 2014/0017559 A1 | 1/2014 | Kawasaki et al. |
| 2014/0017572 A1 | 1/2014 | Uehara et al. |
| 2014/0045002 A1 | 2/2014 | Yokoyama et al. |
| 2014/0045034 A1 | 2/2014 | Kondo et al. |
| 2014/0045049 A1 | 2/2014 | Iyori et al. |
| 2014/0045050 A1 | 2/2014 | Hattori et al. |
| 2014/0045051 A1 | 2/2014 | Hattori et al. |
| 2014/0045057 A1 | 2/2014 | Tode et al. |
| 2014/0045077 A1 | 2/2014 | Minami et al. |
| 2014/0079990 A1 | 3/2014 | Yanagida et al. |
| 2014/0120415 A1 | 5/2014 | Surugo et al. |
| 2014/0141323 A1 | 5/2014 | Saruwatari et al. |
| 2014/0178772 A1 | 6/2014 | Jeong et al. |
| 2014/0227584 A1 | 8/2014 | Holstein et al. |
| 2014/0234701 A1 | 8/2014 | Tanaka et al. |
| 2014/0243561 A1 | 8/2014 | Mueller et al. |
| 2014/0248529 A1 | 9/2014 | Chen et al. |
| 2014/0302401 A1 | 10/2014 | Burkhardt et al. |
| 2014/0302402 A1 | 10/2014 | Chen et al. |
| 2014/0308578 A1 | 10/2014 | Onizuka et al. |
| 2014/0322579 A1 | 10/2014 | Mitsuhashi et al. |
| 2014/0322616 A1 | 10/2014 | Onizuka et al. |
| 2014/0329141 A1 | 11/2014 | Onizuka et al. |
| 2015/0049642 A1 | 2/2015 | Eng et al. |
| 2015/0086862 A1 | 3/2015 | Osada et al. |
| 2015/0111112 A1 | 4/2015 | Petrov et al. |
| 2015/0140444 A1 | 5/2015 | Dubois et al. |
| 2015/0171467 A1 | 6/2015 | Dubois et al. |

(56) References Cited

U.S. PATENT DOCUMENTS

| | | |
|---|---|---|
| 2015/0303521 A1 | 10/2015 | Sasaki et al. |
| 2016/0049691 A1 | 2/2016 | Suzuki et al. |
| 2016/0087307 A1 | 3/2016 | Burkhardt et al. |

FOREIGN PATENT DOCUMENTS

| | | |
|---|---|---|
| CN | 102983358 A | 3/2013 |
| CN | 103117414 A | 5/2013 |
| CN | 103165939 A | 6/2013 |
| CN | 103682440 A | 3/2014 |
| CN | 103730688 A | 4/2014 |
| CN | 103943884 A1 | 7/2014 |
| CN | 103972588 A1 | 8/2014 |
| EP | 0924788 A1 | 6/1999 |
| EP | 1890357 A | 2/2008 |
| EP | 2037029 A1 | 3/2009 |
| EP | 2365573 A3 | 9/2011 |
| EP | 2378602 A2 | 10/2011 |
| EP | 2535975 A1 | 12/2012 |
| EP | 2571089 A1 | 3/2013 |
| EP | 2626943 A1 | 8/2013 |
| EP | 2339684 B1 | 9/2013 |
| JP | 62290072 A | 12/1987 |
| JP | 620719 A | 1/1994 |
| JP | 3444607 B2 | 1/1994 |
| JP | 08298134 A | 11/1996 |
| JP | H9-199168 A | 7/1997 |
| JP | 3311611 B2 | 5/1998 |
| JP | 10116627 A | 6/1998 |
| JP | 1186901 A | 3/1999 |
| JP | 2000188128 A | 7/2000 |
| JP | 2001345120 A | 12/2001 |
| JP | 2002124263 A | 4/2002 |
| JP | 2003100342 A | 4/2003 |
| JP | 2003282138 A | 10/2003 |
| JP | 2004047131 A | 2/2004 |
| JP | 2009123465 | 6/2004 |
| JP | 2004281185 A | 7/2004 |
| JP | 2004241339 A | 8/2004 |
| JP | 2005078820 A | 3/2005 |
| JP | 2005293920 A | 10/2005 |
| JP | 2006032300 A | 2/2006 |
| JP | 2006140115 A | 6/2006 |
| JP | 2006172721 A | 6/2006 |
| JP | 2006172950 A | 6/2006 |
| JP | 2006331866 A | 7/2006 |
| JP | 2006210022 A | 8/2006 |
| JP | 2008123714 A | 5/2008 |
| JP | 2008159419 A | 7/2008 |
| JP | 2008288144 A | 11/2008 |
| JP | 4328915 A | 9/2009 |
| JP | 2011049153 A | 3/2011 |
| JP | 2011071098 B2 | 4/2011 |
| JP | 2011082033 A | 4/2011 |
| JP | 2012094491 A | 5/2012 |
| JP | 5201364 A | 6/2013 |
| JP | 5321063 B2 | 6/2013 |
| JP | 5235437 B2 | 7/2013 |
| JP | 2015005443 A | 1/2015 |
| KR | 100908570 A | 8/2005 |
| KR | 20130134237 A | 12/2013 |
| KR | 20140083170 A | 7/2014 |
| KR | 20140106355 A | 9/2014 |
| KR | 20150106557 A | 9/2015 |
| KR | 101561646 B1 | 10/2015 |
| WO | 9744842 A1 | 11/1997 |
| WO | 2008079670 A1 | 7/2008 |
| WO | 2008153309 A1 | 12/2008 |
| WO | 2009022848 A1 | 2/2009 |
| WO | 2009035222 A1 | 3/2009 |
| WO | 2009038358 A1 | 3/2009 |
| WO | 2009040367 A1 | 4/2009 |
| WO | 2011051275 A1 | 5/2011 |
| WO | 2011099580 A1 | 8/2011 |
| WO | 2012046514 A1 | 4/2012 |
| WO | 2012132059 A1 | 10/2012 |
| WO | 2012132060 A1 | 10/2012 |
| WO | 2012132976 A1 | 10/2012 |
| WO | 2012005945 A1 | 12/2012 |
| WO | 2012170240 A1 | 12/2012 |
| WO | 2012176873 A1 | 12/2012 |
| WO | 2013010985 A1 | 1/2013 |
| WO | 2013033595 A1 | 3/2013 |
| WO | 2013137351 A1 | 9/2013 |
| WO | 2013180781 A1 | 12/2013 |
| WO | 2013180782 A1 | 12/2013 |
| WO | 2013180783 A1 | 12/2013 |
| WO | 2013184881 A1 | 12/2013 |
| WO | 2014080871 A1 | 5/2014 |
| WO | 2014165748 A1 | 10/2014 |
| WO | 2015046174 A1 | 4/2015 |
| WO | 2015051131 A1 | 4/2015 |
| WO | 2015051141 A1 | 4/2015 |
| WO | 2015121731 A1 | 8/2015 |
| WO | 2015179205 A1 | 11/2015 |
| WO | 2015179210 A1 | 11/2015 |
| WO | 2016025589 A1 | 2/2016 |
| WO | 2016044088 A1 | 3/2016 |

OTHER PUBLICATIONS

Machine Translation of Abstract, JP3444607B2, espacenet.com.
Machine Translation of Abstract, JPH08298134A, espacenet.com.
Machine Translation, JP3311611B2 (JPH10116627A), Questel's orbits.com.
Machine Translation, JP2003100342A, Questel's orbits.com.
Machine Translation of Abstract, JP2009123465, Patent Abstracts of Japan.
Lee et al., SEI Layer-Forming Additives for LINI0.5MN1.5O4/ Graphite 5 V Li-Ion Batteries, Electrochemistry Communications (2007), vol. 9, pp. 801-806.
Liu et at., Understanding The Improved Electrochemical Performances of Fe-Substituted 5 V Spinel Cathode LIMN1.5NI0.5O4, J. Phys. Chem. C. (2009), vol. 113, pp. 15073-15079.
Smart et al., Li-Ion Electrolytes Containing Ester Co-Solvents for Wide Operating Temperature Range, ECS Transactions (2008) vol. 11, No. 29, pp. 99-108.
Smith et al., Electrolytes Containing Fluorinated Ester Co-Solvents for Low-Temperature Li-Ion Cells, ECS Transactions (2008), vol. 11, No. 29, pp. 91-98.
Zhong et al., Effects of Al Substitution for Ni and Mn on The Electrochemical Properties LINI0.5MN1.5O4, Electrochimica Acta (2011), vol. 56, pp. 6554-6561.
International Search Report, Corresponding PCT Application No. PCT/US2012/053415 (E. I. Du Pont De Nemours and Co.,), dated Jan. 22, 2013.
Related U.S. Appl. No. 14/241,898 (Chen et al.,), filed Aug. 31, 2012.
International Search Report, Releated PCT Application No. PCT/US2012/0534239 (E. I. Du Pont De Nemours and Co.,), dated Jan. 22, 2013.
Bessler et al., "Boron Complexes with Dicarboxylic Acids", Zeitschrift fuer Naturforschung, Teil B: Anorganische chemie, Organische Chemie, vol. 37B, Issue 8, pp. 1020-1025, Journal, 1982, CODEN: ZNBAD2, issn: 0340-5087. See also English abstract.
Henne, A.L, "A New Fluorination Method", J Am. Chem. Soc., 60(7), 1938, 1569-1571.
Hine, J. et al., "Methylenes as Intermediates in Polar Reactions. XXI. A Sulfur-containing Methylene", J. Amer. Chem. Soc. 82, 6118, 1960.
Jeong, S.-K., et al, "Surface Film Formation on a Graphite Negative Electrode in Lithium-Ion Batteries: Atomic Force Microscopy Study on the Effects of Film-Forming Additives in Propylene Carbonate Solutions", Langmuir, 2001, 17, 8281-8286.
Jung, H.M., et al., "Fluoropropane Sultone as an SEI-forming Additive that Outperforms Vinylene Carbonate", J. Mater. Chem. A, 2013, 1, 11975.

(56) References Cited

OTHER PUBLICATIONS

Kudryavtsev, I.Y., et al, "Catalytic Phosphorylation of Polyfluoroalkanols", Izvestiya Akademii Nausk SSSR, Seriya Khimicheskaya, 1982, 11, 2535-2540. Translation.

McMillan, R. et al., "Fluoroethylene Carbonate Electrolyte and its Use in Lithium Ion Batteries with Graphite Anodes", J Power Sources 81-82 (1999) 20-26.

Mogi, Ryo et al, "Effects of Some Organic Additives on Lithium Deposition in Propylene Carbonate", J. Electrochem. Soc., 2002, 149(12), A1578-A1583.

Nagasubramanian, G. "Fluoro-Carbonate Solvents for Li-Ion Cells", Proc. Electrochem. Soc., 2000, 99(25), 434-439.

Nakajima, T. et al., "Effect of Fluoroesters on the Low Temperature Electrochemical Characteristics of Graphite Electrode", J Fluorine Chem 87 (1998) 221-227.

Rajeshwaran, G. G., et al, "Lewis Acid-Mediated Michaelis-Arbuzov Reaction at Room Temperature: A Facile Preparation of Arylmethyl/Heteroarylmethyl Phosphonates", Org. Lett., 2011, 13, 1270-1273.

Sasaki, Y. et al, "Physical and Electrolytic Properties of Partially Fluorinated Organic Solvents and its Application to Secondary Lithium Batteries: Partially Fluorinated Dialkoxyethanes", ECS Transactions, 16, (35), 2009, 23-31.

Schmitz, R.W. et al, "Investigations on Novel Electrolytes, Solvents and SEI Additives for Use in Lithium-ion Batteries: Systematic Electrochemical Characterization and Detailed Analysis by Spectroscopic Methods", Progress Solid State Chem., 42 (2014) 65-84.

Sekiya, A. et al, "The Potential of Hydrofluoroethers to Replace CFCs, HCFCs, and PFCs", J Fluorine Chem, 101 (2000) 215-221.

SynQuest Laboratories, Inc. Research Chemicals Catalog, 2003, pp. 128-129.

Tarrant, P. et al, "Some Reactions of Fluoroethanes with Sodium Ethoxide", J. Am. Chem. Soc., 75, (1953), 932-934.

Von Cresce, A. et al, "Electrolyte Additive in Support of 5 V Li Ion Chemistry", J Electrochem. Soc., 158 (3), A337-A342 (2011).

Wachtler, M. et al., "The Behaviour of Graphite, Carbon Black, and Li4Ti5O12 in LiBOB-Based Electrolytes", J. Applied Electrochemistry (2006) 36: 1199-1206.

Xu et al, "Sulfone-Based Electrolytes for Lithium-Ion Batteries", Journal of the electrochemical Society, 2002, A920-A926, 149 (7).

Xu, K. "Nonaqueous Liquid Electrolytes for Lithium-Based Rechargeable Batteries", Chem. Rev., 2004, 104, 4303-4418.

Yamaki, J.-I. et al, "Thermal Studies of Fluorinated Ester as a Novel Candidate for Electrolyte Solvent of Lithium Metal Anode Rechargeable Cells", J Power Sources, 102 (2001) 288-293.

Yang, L. et al., "Effect of Impurities and Moisture on Lithium Bisoxalatoborate (LiBOB) Electrolyte Performance in Lithium-Ion Cells", J. Power Sources 195 (2010) 1698-1705.

Yoon, S. et al, "Sb-Mox-C (M =Al, Ti, or Mo) Nanocomposite Anodes for Lithium-Ion Batteries", Chem. Mater. 2009, 21, 3898-3904.

Zaharov et al., "A New Method of Phosphorylation of Polyfluorinated Aliphatic Alcohols", Izvestiya Akademii Nausk USSR, Seriya Khimicheskaya, No. 8, p. 1860, 1969, Translation.

Zhang, S.S., "A Review on Electrolyte Additives for Lithium-Ion Batteries", J Power Sources, 162 (2006) 1379-1394.

International Search Report and Written Opinion, Corresponding PCT International Application PCT/US2013/029815 dated Jun. 6, 2013.

International Search Report and Written Opinion, Corresponding PCT International Application PCT/US2013/029818 dated May 14, 2013.

International Search Reportand Written Opinion, Corresponding PCT International Application PCT/US2013/029825 dated May 14, 2013.

International Search Report and Written Opinion, Corresponding PCT International Application PCT/US2014/058845 dated Dec. 11, 2014.

International Search Report and Written Opinion, Corresponding PCT International Application PCT/US2014/058859 dated Feb. 25, 2015.

International Search Report and Written Opinion, Corresponding PCT International Application PCT/US2014/032961 dated Jul. 15, 2014

International Search Report and Written Opinion, Corresponding PCT International Application PCT/US2015/030785 dated Jul. 16, 2015.

International Search Report and Written Opinion, Corresponding PCT International Application PCT/US2015/030807 dated Jul. 17, 2015.

International Search Report and Written Opinion, Corresponding PCT International Application PCT/US2015/044844 dated Dec. 22, 2015.

International Search Report and Written Opinion, Corresponding PCT International Application PCT/US2015/049642 dated Dec. 22, 2015.

\* cited by examiner

FLUORINATED ELECTROLYTE COMPOSITIONS

This application claims priority under 35 U.S.C. § 119(e) from, and claims the benefit of, U.S. Provisional Application No. 61/530,545, filed 2 Sep. 2011, which is by this reference incorporated in its entirety as a part hereof for all purposes.

TECHNICAL FIELD

The disclosure hereof relates to electrolyte compositions containing 2,2,-difluoroethyl acetate and ethylene carbonate, which are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at battery voltages above 4.4 V these electrolyte solvents can decompose, which can result in a loss of battery performance. Additionally, there are safety concerns with the use of these electrolyte solvents because of their low boiling point and high flammability.

To overcome the limitations of commonly used non-aqueous electrolyte solvents, various fluorine-containing carboxylic acid ester electrolyte solvents have been investigated for use in lithium ion batteries (see, for example, Nakamura et al in JP 4/328,915-B2, JP 3/444,607-B2, and U.S. Pat. No. 8,097,368). Although these fluorine-containing carboxylic acid ester electrolyte solvents can be used in lithium ion batteries having high voltage cathodes, such as the 4.7 V $LiMn_{1.5}Ni_{0.5}O_4$ cathode, cycling performance can be limited, particularly at high temperatures.

Despite the efforts in the art as described above, a need remains for electrolyte solvents, and compositions thereof, that will have improved cycling performance at high temperature when used in a lithium ion battery, particularly such a battery that operates at high voltage (i.e. up to about 5 V), or that incorporates a high voltage cathode.

SUMMARY

In one embodiment, there is provided herein an electrolyte composition comprising:
  (a) at least one electrolyte salt; and
  (b) a solvent mixture comprising ethylene carbonate and $CH_3CO_2CH_2CF_2H$.

In another embodiment, there is provided herein an electrolyte composition comprising:
  (a) at least one electrolyte salt; and
  (b) a solvent mixture comprising ethylene carbonate at a concentration of about 10% to about 50% by weight of the solvent mixture; and $CH_3CO_2CH_2CF_2H$ at a concentration of about 50% to about 90% by weight of the solvent mixture.

In yet another embodiment, there is provided herein an electrochemical cell comprising the electrolyte composition disclosed herein.

In a further embodiment, the electrochemical cell is a lithium ion battery.

DETAILED DESCRIPTION

Figure 1:
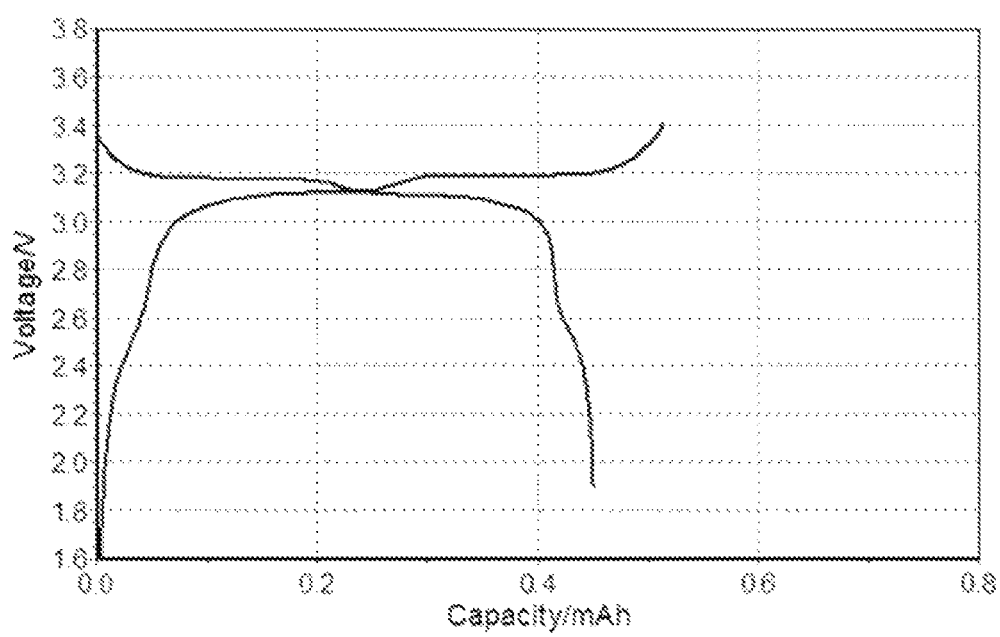
FIGS. 1-3 are voltage vs. capacity curves for the first charge and discharge cycles for full cells containing the electrolyte compositions disclosed herein, as described in Examples 5-6 and Comparative Example 2, respectively.

As used above and throughout the description of the invention, the following terms, unless otherwise indicated, shall be defined as follows:

The term "electrolyte composition" as used herein, refers to a chemical composition suitable for use as an electrolyte in an electrochemical cell. An electrolyte composition typically comprises at least one solvent and at least one electrolyte salt.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharging and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharging and oxidation occurs during charging.

The term "lithium ion battery" refers to a type of rechargeable battery in which lithium ions move from the anode to the cathode during discharge, and from the cathode to the anode during charge.

Disclosed herein are electrolyte compositions comprising a fluorine-containing carboxylic acid ester and ethylene carbonate. The electrolyte compositions are useful in electrochemical cells, particularly lithium ion batteries. Specifically, the electrolyte compositions disclosed herein comprise at least one electrolyte salt, and a solvent mixture comprising $CH_3CO_2CH_2CF_2H$ (2,2,-difluoroethyl acetate, CAS No. 1550-44-3), and ethylene carbonate (also referred to as 1,3-dioxolan-2-one, CAS No. 96-49-1).

In one embodiment, ethylene carbonate comprises about 10% to about 50% by weight of the solvent mixture. In another embodiment, ethylene carbonate comprises about 20% to about 40% by weight of the solvent mixture. In another embodiment, ethylene carbonate comprises about 25% to about 35% by weight of the solvent mixture. In another embodiment, ethylene carbonate comprises about 30% by weight of the solvent mixture.

In an alternative embodiment, 2,2,-difluoroethyl acetate comprises about 50% to about 90% by weight of the solvent mixture. In another embodiment, 2,2,-difluoroethyl acetate comprises about 60% to about 80% by weight of the solvent mixture. In another embodiment, 2,2,-difluoroethyl acetate comprises about 65% to about 75% by weight of the solvent mixture. In another embodiment, 2,2,-difluoroethyl acetate comprises about 70% by weight of the solvent mixture.

Ethylene carbonate of suitable purity for use in the electrolyte compositions disclosed herein may be obtained from commercial sources such as Novolyte (Independence, Ohio). The 2,2,-difluoroethyl acetate may be prepared using methods known in the art. For example, acetyl chloride may be reacted with 2,2-difluoroethanol (with or without a basic catalyst) to form 2,2-difluoroethyl acetate. Additionally, 2,2-difluoroethyl acetate may be prepared using the method described by Wiesenhofer et al. (WO 2009/040367 A1, Example 5). Alternatively, 2,2-difluoroethyl acetate can be prepared using the method described in the examples herein below. It is desirable to purify the 2,2-difluoroethyl acetate to a purity level of at least about 99.9%, more particularly at least about 99.99%. The 2,2-difluoroethyl acetate may be purified using distillation methods such as vacuum distillation or spinning band distillation.

The electrolyte compositions disclosed herein also contain at least one electrolyte salt. Suitable electrolyte salts include without limitation
lithium hexafluorophosphate,
$LiPF_3(CF_2CF_3)_3$,
lithium bis(trifluoromethanesulfonyl)imide,
lithium bis(perfluoroethanesulfonyl)imide,
lithium (fluorosulfonyl) (nonafluorobutanesulfonyl) imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
$Li_2B_{12}F_{12-x}H_x$ where x is equal to 0 to 8, and mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, more particularly about 0.5 to about 1.2 M, and more particularly about 1.0 to about 1.2 M.

The electrolyte composition disclosed herein may further comprise at least one additional co-solvent. Examples of suitable co-solvents include without limitation one or more carbonates. Suitable carbonates include ethyl methyl carbonate, dimethyl carbonate, diethyl carbonate, propylene carbonate, vinylethylene carbonate, fluoroethylene carbonate, 2,2,2-trifluoroethyl carbonate, and methyl 2,2,3,3-tetrafluoropropyl carbonate. In other embodiments, suitable co-solvents include without limitation those selected from the group consisting of ethyl methyl carbonate, dimethyl carbonate, diethyl carbonate, propylene carbonate, vinylethylene carbonate, 2,2,2-trifluoroethyl carbonate, and methyl 2,2,3,3-tetrafluoropropyl carbonate. It is desirable to use a co-solvent that is battery grade or has a purity level of at least about 99.9%, and more particularly at least about 99.99%. When an additional co-solvent is used, the co-solvent comprises about 10% to about 40% by weight, or about 15% to about 35% by weight, or about 20% to about 30% by weight, of the solvent mixture.

When fluoroethylene carbonate (also referred to herein as 4-fluoro-1,3-dioxolan-2-one, CAS No. 114435-02-8) is used as the co-solvent, it can if desired be used in an amount of about 0.01% to less than 2%, more particularly about 0.1% to about 1.8%, more particularly about 0.5% to about 1.5%, and more particularly about 1% by weight of the total electrolyte composition. It is desirable to purify the fluoroethylene carbonate to a purity level of at least about 99.0%, more particularly at least about 99.9%. Purification may be done using known methods, as described above. Fluoroethylene carbonate is available from companies such as China LangChem INC. (Shanghai, China) and MTI Corp. (Richmond, Calif.).

In a further alternative embodiment, ethylene carbonate comprises about 10% to about 50% by weight of the solvent mixture; and 2,2,-difluoroethyl acetate comprises about 50% to about 90% by weight of the solvent mixture.

In a further alternative embodiment, ethylene carbonate comprises about 20% to about 40% by weight of the solvent mixture; and 2,2,-difluoroethyl acetate comprises about 60% to about 80% by weight of the solvent mixture.

In a further alternative embodiment, ethylene carbonate comprises about 25% to about 35% by weight of the solvent mixture; and 2,2,-difluoroethyl acetate comprises about 65% to about 75% by weight of the solvent mixture.

In a further alternative embodiment, ethylene carbonate comprises about 10% to about 50% by weight of the solvent mixture; 2,2,-difluoroethyl acetate comprises about 50% to about 90% by weight of the solvent mixture; and a co-solvent comprises about 10% to about 40% by weight of the solvent mixture.

In a further alternative embodiment, ethylene carbonate comprises about 10% to about 50% by weight of the solvent mixture; 2,2,-difluoroethyl acetate comprises about 50% to about 90% by weight of the solvent mixture; and a co-solvent comprises about 15% to about 35% by weight of the solvent mixture.

In a further alternative embodiment, ethylene carbonate comprises about 10% to about 50% by weight of the solvent mixture; 2,2,-difluoroethyl acetate comprises about 50% to about 90% by weight of the solvent mixture; and a co-solvent comprises about 20% to about 30% by weight of the solvent mixture.

In a further alternative embodiment, ethylene carbonate comprises about 10% to about 50% by weight of the solvent mixture; 2,2,-difluoroethyl acetate comprises about 50% to about 90% by weight of the solvent mixture; and fluoroethylene carbonate comprises an amount of about 0.01% to less than 2% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; and fluoroethylene carbonate comprises an amount of about 0.1% to less than 1.8% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; and fluoroethylene carbonate comprises an amount of about 0.5% to about 1.5% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; and a co-solvent comprises about 10% to about 40% by weight of the solvent mixture.

In a further alternative embodiment, ethylene carbonate comprises about 20% to about 40% by weight of the solvent mixture; 2,2,-difluoroethyl acetate comprises about 60% to about 80% by weight of the solvent mixture; and a co-solvent comprises about 15% to about 35% by weight of the solvent mixture.

In a further alternative embodiment, ethylene carbonate comprises about 20% to about 40% by weight of the solvent mixture; 2,2,-difluoroethyl acetate comprises about 60% to about 80% by weight of the solvent mixture; and a cosolvent comprises about 20% to about 30% by weight of the solvent mixture.

In a further alternative embodiment, ethylene carbonate comprises about 20% to about 40% by weight of the solvent mixture; 2,2,-difluoroethyl acetate comprises about 60% to about 80% by weight of the solvent mixture; and fluoroethylene carbonate comprises an amount of about 0.01% to less than 2% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; and fluoroethylene carbonate comprises an amount of about 0.1% to less than 1.8% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; and fluoroethylene carbonate comprises an amount of about 0.5% to about 1.5% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; and a co-solvent comprises about 10% to about 40% by weight of the solvent mixture.

In a further alternative embodiment, ethylene carbonate comprises about 25% to about 35% by weight of the solvent mixture; 2,2,-difluoroethyl acetate comprises about 65% to about 75% by weight of the solvent mixture; and a co-solvent comprises about 15% to about 35% by weight of the solvent mixture.

In a further alternative embodiment, ethylene carbonate comprises about 25% to about 35% by weight of the solvent mixture; 2,2,-difluoroethyl acetate comprises about 65% to about 75% by weight of the solvent mixture; and a co-solvent comprises about 20% to about 30% by weight of the solvent mixture.

In a further alternative embodiment, ethylene carbonate comprises about 25% to about 35% by weight of the solvent mixture; 2,2,-difluoroethyl acetate comprises about 65% to about 75% by weight of the solvent mixture; and fluoroethylene carbonate comprises an amount of about 0.01% to less than 2% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; and fluoroethylene carbonate comprises an amount of about 0.1% to less than 1.8% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; and fluoroethylene carbonate comprises an amount of about 0.5% to about 1.5% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 10% to about 40% by weight of the solvent mixture; and fluoroethylene carbonate comprises an amount of about 0.01% to less than 2% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 10% to about 40% by weight of the solvent mixture; and fluoroethylene carbonate comprises an amount of about 0.1% to about 1.8% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 10% to about 40% by weight of the solvent mixture; and fluoroethylene carbonate comprises an amount of about 0.5% to about 1.5% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 15% to about 35% by weight of the solvent mixture; and fluoroethylene carbonate comprises an amount of about 0.01% to less than 2% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 15% to about 35% by weight of the solvent mixture; and fluoroethylene carbonate comprises an amount of about 0.1% to about 1.8% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 15% to about 35% by weight of the solvent mixture; and fluoroethylene carbonate comprises an amount of about 0.5% to about 1.5% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 20% to about 30% by weight of the solvent mixture; and fluoroethylene carbonate comprises an amount of about 0.01% to less than 2% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 20% to about 30% by weight of the solvent mixture; and fluoroethylene carbonate comprises an amount of about 0.1% to about 1.8% by weight of the total electrolyte composition.

In a further alternative embodiment, ethylene carbonate comprises about 10% to about 50% by weight of the solvent mixture; 2,2,-difluoroethyl acetate comprises about 50% to about 90% by weight of the solvent mixture; a co-solvent comprises about 20% to about 30% by weight of the solvent mixture; and fluoroethylene carbonate comprises an amount of about 0.5% to about 1.5% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 10% to about 40% by weight of the solvent mixture; and fluoroethylene carbonate comprises an amount of about 0.01% to less than 2% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 10% to about 40% by weight of the solvent mixture; and fluoroethylene carbonate comprises an amount of about 0.1% to about 1.8% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 10% to about 40% by weight of the solvent mixture; and fluoroethylene carbonate comprises an amount of about 0.5% to about 1.5% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 15% to about 35% by weight of the solvent mixture; and fluoroethylene carbonate comprises an amount of about 0.01% to less than 2% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 15% to about 35% by weight of the solvent mixture; and fluoroethylene carbonate comprises an amount of about 0.1% to about 1.8% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 15% to about 35% by weight of the solvent mixture; and fluoroethylene carbonate comprises an amount of about 0.5% to about 1.5% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 20% to about 30% by weight of the solvent mixture; and fluoroethylene carbonate comprises an amount of about 0.01% to less than 2% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 20% to about 30% by weight of the solvent mixture; and fluoroethylene carbonate comprises an amount of about 0.1% to about 1.8% by weight of the total electrolyte composition.

In a further alternative embodiment, ethylene carbonate comprises about 20% to about 40% by weight of the solvent mixture; 2,2,-difluoroethyl acetate comprises about 60% to about 80% by weight of the solvent mixture; a co-solvent comprises about 20% to about 30% by weight of the solvent mixture; and fluoroethylene carbonate comprises an amount of about 0.5% to about 1.5% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 10% to about 40% by weight of the solvent mixture; and fluoroethylene carbonate comprises an amount of about 0.01% to less than 2% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 10% to about 40% by weight of the solvent mixture; and fluoroethylene carbonate comprises an amount of about 0.1% to about 1.8% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 10% to about 40% by weight of the solvent mixture; and fluoroethylene carbonate comprises an amount of about 0.5% to about 1.5% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 15% to about 35% by weight of the solvent mixture; and fluoroethylene carbonate comprises an amount of about 0.01% to less than 2% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 15% to about 35% by weight of the solvent mixture; and fluoroethylene carbonate comprises an amount of about 0.1% to about 1.8% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 15% to about 35% by weight of the solvent mixture; and fluoroethylene carbonate comprises an amount of about 0.5% to about 1.5% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 20% to about 30% by weight of the solvent mixture; and fluoroethylene carbonate comprises an amount of about 0.01% to less than 2% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 20% to about 30% by weight of the solvent mixture; and fluoroethylene carbonate comprises an amount of about 0.1% to about 1.8% by weight of the total electrolyte composition.

In a further alternative embodiment, ethylene carbonate comprises about 25% to about 35% by weight of the solvent mixture; 2,2,-difluoroethyl acetate comprises about 65% to about 75% by weight of the solvent mixture; a co-solvent comprises about 20% to about 30% by weight of the solvent mixture; and fluoroethylene carbonate comprises an amount of about 0.5% to about 1.5% by weight of the total electrolyte composition.

In another embodiment, the invention provides an electrochemical cell comprising a housing, an anode and a cathode disposed in the housing and in conductive contact with one another, an electrolyte composition, as described above, providing an ionically conductive pathway between the anode and the cathode, and a porous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The separator may also be a polyimide nanoweb (EP 2037029; U.S. Patent Application No. 2011/0143217 A1). The pore size of the porous separator is sufficiently large to permit transport of ions, but small enough to prevent contact of the anode and cathode either directly or from particle penetration or dendrites which can form on the anode and cathode.

In another embodiment, the electrochemical cell is a lithium ion battery. Suitable cathode materials for a lithium ion battery include without limitation electroactive transition metal oxides comprising lithium, such as $LiCoO_2$, $LiNiO_2$, $LiMn_2O_4$ or $LiV_3O_8$; oxides of layered structure such as $LiNi_xMn_yCo_zO_2$ where x+y+z is about 1, $LiCo_{0.2}Ni_{0.2}O_2$, $LiFePO_4$, $LiMnPO_4$, $LiCoPO_4$, $LiNi_{0.5}Mn_{1.5}O_4$, or $LiVPO_4F$; mixed metal oxides of cobalt, manganese, and nickel such as those described in U.S. Pat. No. 6,964,828 (Lu) and U.S. Pat. No. 7,078,128 (Lu); nanocomposite cathode compositions such as those described in U.S. Pat. No. 6,680,145 (Obrovac); lithium-rich layered-layered composite cathodes such as those described in U.S. Pat. No. 7,468,223; and cathodes such as those described in U.S. Pat. No. 7,718,319 and the references therein (each of the above mentioned U.S. patents being by this reference incorporated in its entirety as a part hereof for all purposes).

In another embodiment, the cathode in the lithium ion battery hereof comprises a cathode active material exhibiting greater than 30 mAh/g capacity in the potential range greater than 4.6 V versus lithium metal. One example of such a cathode is a manganese cathode comprising a lithium-containing manganese composite oxide having a spinel structure as cathode active material. The lithium-containing manganese composite oxide in a cathode suitable for use herein comprises oxides of the formula

$Li_zMn_{1.5}Ni_xM_yO_{4-d}$, (Formula I)

wherein M is at least one metal selected from the group consisting of Al, Cr, Fe, Ga, Zn, Co, Nb, Mo, Ti, Zr, Mg, V and Cu, 0.38≤x<0.5, 0<y≤0.12, 0≤d≤0.3, and 0.00<z≤1.1, and z changes in accordance with release and uptake of lithium ions and electrons during charge and discharge.

In one embodiment, M in the above formula is Fe; in another embodiment, M in the above formula is Ga; and in another embodiment, M is the above formula is Fe and Ga. In the various embodiments hereof, the values of x and y can be selected from any one of the members of the group of couples consisting of: x=0.38/y=0.12, x=0.39/y=0.11, x=0.40/y=0.1, x=0.41/y=0.09, x=0.42/y=0.08, x=0.43/y=0.07, x=0.44/y=0.06, x=0.45/y=0.05, x=0.46/y=0.04, x=0.47/y=0.03, x=0.48/y=0.02, x=0.49/y=0.01.

In one embodiment, z has a value given by 0.03≤z≤1.1. In another embodiment, z has a value given by 0.03≤z≤1.0. In one embodiment, M in the above formula is at least one metal selected from the group consisting of Al, Cr, Fe, Ga and Zn, 0.4≤x<0.5, 0<y≤0.1, z=1 and d=0.

The lithium cathode material described above is believed to be stabilized by the presence of the M component in the compound. Manganese cathodes stabilized by other systems may also comprise spinel-layered composites which contain a manganese-containing spinel component and a lithium rich layered structure, as described in U.S. Pat. No. 7,303,840.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH.H_2O$ at about 800 to about 950° C. in oxygen for 3 to 24 hours, as described in detail in the examples herein. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein can further contain an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; and lithium titanates such as $Li_4Ti_5O_{12}$ and $LiTi_2O_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as NEI Inc. (Somerset N.J.), and Farasis Energy Inc. (Hayward Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010), which is by this reference incorporated in its entirety as a part hereof for all purposes.

The housing of the lithium ion battery hereof may be any suitable container to house the lithium ion battery components described above. Such a container may be fabricated in the shape of small or large cylinder, a prismatic case or a pouch.

The lithium ion battery hereof may be used for grid storage or as a power source in various electronically-powered or -assisted devices ("Electronic Device") such as a transportation device (including a motor vehicle, automobile, truck, bus or airplane), a computer, a telecommunications device, a camera, a radio or a power tool.

EXAMPLES

The subject matter disclosed herein is further defined in the following examples. It should be understood that these examples, while describing various features of certain particular embodiments of some of the inventions hereof, are given by way of illustration only.

The meaning of abbreviations used is as follows: "cm" means centimeter(s), "mm" means millimeter(s), "μm" means micrometer(s), "g" means gram(s), "mg" means milligram(s), "kg" means kilogram(s), "μg" means microgram(s), "L" means liter(s), "mL" means milliliter(s), "μL" means microliter(s), "mol" means mole(s), "mmol" means millimole(s), "M" means molar concentration, "h" means hour(s), "min" means minute(s), "s" means second(s), "wt %" means percent by weight, "Hz" means hertz, "mS" means millisiemens(s), "mA" mean milliamp(s), "mAh means milliamp 20 hour(s), "mAh/g" means milliamp hour(s) per gram, "mAh/cm$^2$" means milliamp hour(s) per cm, "V" means volt(s), "dc" means direct current, "x C" refers to a constant current that can fully charge/discharge the cathode in 1/x hours, "kPa" means kilopascal(s), "rpm" means revolutions per 25 minute, "psi" means pounds per square inch.

Materials and Methods
Purification of 2,2-Difluoroethyl Acetate (DFEA)

2,2-Difluoroethyl acetate, obtained from Matrix Scientific (Columbia, S.C.), was purified by spinning band distillation twice to 99.99% purity, as determined by gas chromatography using a flame ionization detector.

Preparation of $LiMn_{1.5}Ni_{0.42}Fe_{0.8}O_4$ (Fe-LNMO) Cathode Active Material For the preparation of $LiMn_{1.5}Ni_{0.42}Fe_{0.08}O_4$, 401 g manganese (II) acetate tetrahydrate (Aldrich, No. 63537), 121 g nickel (II) acetate tetrahydrate (measured to have 4.8 water of hydration) (Aldrich, No. 72225) and 15.25 g iron (II) acetate anhydrous (Alfa Aesar, Ward Hill, Mass., No. 31140) were weighed into bottles on a balance then dissolved in 5.0 L of deionized water. KOH pellets were dissolved in 10 L of deionized water to produce a 3.0 M solution inside a 30 L reactor. The acetate solution was transferred to an addition funnel and dripped into the rapidly stirred reactor to precipitate the mixed hydroxide material. Once all 5.0 L of the acetate solution was added to the reactor, stirring was continued for 1 h. Then, stirring was stopped and the precipitate was allowed to settle overnight. After settling the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6 (i.e., the pH of deionized rinse water), and a further 20 L of deionized water was added to each filter cake. Finally the cakes were dried in a vacuum oven at 120° C. overnight. The yield at this point was typically 80-90%.

The hydroxide precipitate was next ground and mixed with lithium carbonate. This step was done in 50 g batches using a Pulverisette automated mortar and pestle (Fritsch GmbH, Idar-Oberstein, Germany). For each batch the hydroxide mixture was weighed, then ground alone for 5 min in the Pulveresette. Then, a stoichiometric amount with small excess of lithium carbonate was added to the system. For 50 g of hydroxide 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

Preparation of an Iron-Doped, Lithium, Nickel, Manganese Oxide (Fe-LNMO) Cathode A cathode paste was prepared from: 3.12 g Fe-LNMO (prepared as described above), 0.390 g carbon black (acetylene black, uncompressed, Denka Corp., New York, N.Y.), 3.24 g of polyvinylidene difluoride (PVDF) solution, 12% in N-methylpyrrolidone (NMP) (KFL #1120, Kureha America Corp., New York, N.Y.) and of 6.17 g NMP. The Fe-LNMO was ground using a mortar and pestle and sifted through a 400 mesh sieve. The carbon black, 5.82 g of NMP, and the PVDF solution were combined in a plastic vial and mixed using a planetary centrifugal mixer (THINKY ARE-310, THINKY Corp., Japan) for 1 min at 2000 rpm. The vial was removed from the mixer, allowed to briefly cool, and the mixing was repeated two more times for a total of three times. The Fe-LNMO and 0.35 g of NMP were then added and centrifugally mixed three times for 1 min at 2000 rpm each time. The vial was mounted in an ice bath and homogenized twice using a rotor-stator (model PT 10-35 GT, 7.5 mm diameter stator, Kinematicia, Bohemia, N.Y.) for min each at 6500 rpm and then twice more for 15 min at 9500 rpm.

The paste was cast using a 50 mm wide doctor blade with a 0.19 mm gate height onto untreated aluminum foil. The electrode was dried in a mechanical convection oven (model FDL-115, Binder Inc., Great River, N.Y.) for 15 min at 100°

C. The loading of Fe-LNMO was about 3 mg/cm². The resulting 50-mm wide electrode was placed between 250 μm thick brass sheets and passed through a calender using 102 mm diameter steel rolls at ambient temperature with a nip force of 330 kg. The electrode was further dried in a vacuum oven at 90° C. at −25 inches of Hg (−85 kPa) for 15 h.

Preparation of a Lithium Titanate (LTO) Anode

The following were used to make the anode paste: 4.16 g $Li_4Ti_5O_{12}$ (LTO, Nanomyte™ BE-10, NEI Corporation, Somerset, N.J.), 4.00 g PVDF solution, 12% in NMP (KFL #1120, Kureha America Corp.), 0.52 g carbon black (acetylene black, uncompressed, Denka Corp., New York, N.Y.), and 9.50 g NMP. The carbon black, PVDF solution, and 8.04 g of the NMP were first combined in a plastic vial and centrifugally mixed (THINKY ARE-310, THINKY Corp., Japan) for 60 s at 2000 rpm. The vial was removed from the mixer, allowed to briefly cool, and the mixing was repeated two more times for a total of three times. The LTO powder, along with the additional NMP, were added to the carbon black and PVDF mixture, and the paste was centrifugally mixed three times for 60 s each time. The vial was mounted in an ice bath and homogenized twice using a rotor-stator (model PT 10-35 GT, 7.5 mm diameter stator, Kinematicia, Bohemia, N.Y.) for 15 min each at 6500 rpm and then twice more for 15 min at 9500 rpm. The paste was cast using a 50 mm wide doctor blade with a 0.25 mm gate height onto untreated aluminum foil. The electrode was dried in a mechanical convection oven (model FDL-115, Binder Inc., Great River, N.Y.) for 15 min at 100 CC. After removal of NMP, the anode consisted of 80:10:10 LTO:PVDF:Carbon Black. The loading of LTO was about 4 mg/cm2. The resulting 50-mm wide electrode was placed between 250 μm thick brass sheets and passed through a calender using 102 mm diameter steel rolls at ambient temperature with a nip force of 250 kg. The electrode was further dried in a vacuum oven at 90° C. at −25 inches of Hg (−85 kPa) for 15 h.

Fabrication of $LiMn_{1.5}Ni_{0.42}Fe_{0.08}O_4/Li_4Ti_5O_{12}$ Full Cells

A $LiMn_{1.5}Ni_{0.42}Fe_{0.08}O_4$ cathode, prepared as described above, a Celgard® separator 2325 (Celgard, LLC. Charlotte, N.C.), a $Li_4Ti_5O_{12}$ anode, prepared as described above, and a few drops of the electrolyte composition of interest, as described below, were sandwiched in 2032 stainless steel coin cell cans to form the $LiMn_{1.5}Ni_{0.42}Fe_{0.08}O_4/Li_4Ti_5O_{12}$ full cells.

Circular pieces of the separator were cut with a ⅝ inch arch punch and the pieces were transferred to a glovebox. Circular sections of $LiMn_{1.5}Ni_{0.42}Fe_{0.08}O_4$ cathodes were cut with a ½ inch arch punch. The cells were cathode limited; that is, the anode loading was high enough such that a circular area of the same size could incorporate more lithium than could be released by the cathode based on conversion of $Li_4Ti_5O_{12}$ to $Li_7Ti_5O_{12}$.

Circular sections of the $Li_4Ti_5O_{12}$ anodes were cut with a %16 inch arch punch. The pre-cut cathode and anode sections were heated to 90° C. for 12 h under vacuum in an antechamber, and then transferred to a glovebox.

The coin cells consisted of coin cell cases (SUS316L), spacer disks, wave springs, and caps, and a polypropylene gasket, all obtained from Hohsen Corp. (Osaka, Japan). The coin cell components were sonicated in ultra-high purity water with detergent for one hour, rinsed with ultra-high purity water for 60 min, and then dried at 90° C. under house vacuum. The cleaned coin cell components were transferred to a glovebox.

A spacer disk and a gasket were placed in the coin cell case and 90 μL of the electrolyte composition to be tested, as described below, was added. A circular separator was then placed on the wetted cathode. An additional 90 μL of electrolyte was added onto the separator. The circular anode section was placed on top of the separator. The spacer disk was set on the anode and all layers were aligned in the center of the coin cell case. The wave spring was set on top of the spacer disk and aligned. The cap was set on top of the wave spring and manually pushed into the gasket. The assembly was placed in an automated coin cell battery crimper (Hohsen Corp. Model SAHCC-2032, Osaka, Japan) and pressure was applied to seal the coin cell.

Comparative Example 1 and Working Examples 1-3

Preparation of Electrolyte Compositions

These Examples describe the preparation of electrolyte compositions containing lithium hexafluorophosphate salt and solvent mixtures comprising 2,2-difluoroethyl acetate (DFEA) and ethylene carbonate (EC); 2,2-difluoroethyl acetate and fluoroethylene carbonate (FEC); and 2,2-difluoroethyl acetate, ethylene carbonate and a small amount of fluoroethylene carbonate.

Electrolyte compositions containing DFEA, EC and 1.0 M $LiPF_6$; and DFEA, FEC and 1.0 M $LiPF_6$ were prepared by weighing predetermined amounts of the components into vials in a dry box. The lithium hexafluorophosphate ($LiPF_6$) (battery grade, Stella Chemifa Corp., Tokyo, Japan) was weighed into each vial to give a final concentration of 1.0 M. Then, the first electrolyte solvent (DFEA, prepared as described above) and the second electrolyte solvent (EC, battery grade, obtained from Novolyte Corp. Cleveland, Ohio; or FEC, obtained from LongChem, Shanghai, China, and purified by vacuum distillation) were weighed into each vial to give the desired weight percent (wt %) of each component. An electrolyte composition containing DFEA, EC, 1.0 M $LiPF_6$, and 1% FEC was prepared by weighing a predetermined amount of FEC and adding it to a predetermined amount of the electrolyte composition containing DFEA, EC and 1.0 M $LiPF_6$. The components of the electrolyte compositions are summarized in Table 1.

TABLE 1

Electrolyte Compositions

| Example | $LiPF_6$ (M) | First Electrolyte Solvent (wt %) [a] | Second Electrolyte Solvent (wt %) [a] | Additive (wt %) [b] |
|---|---|---|---|---|
| 1 Comparative[c] | 1.0 | DFEA (80%) | FEC (20%) | 0% |
| 1 | 1.0 | DFEA (80%) | EC (20%) | 0% |
| 2 | 1.0 | DFEA (70%) | EC (30%) | 0% |
| 3 | 1.0 | DFEA (70%) | EC (30%) | FEC (1%) |

[a] Weight percent solvent as a percentage of the total solvent mixture (does not include salt or additive)
[b] Weight percent in final electrolyte composition (includes both solvents, salt, and additive)
[c] Electrolyte composition as described in U.S. Pat. No 8,097,368, Example 1.

Example 4

Ionic Conductivity of Electrolyte Compositions

The electrical conductivity of the electrolyte compositions described in Comparative Example 1 and Working Examples 1-3 was measured using ac impedance spectroscopy over the frequency range of 0.1 to 1,000,000 Hz. The impedance results were fit with an equivalent circuit model to yield the dc resistance.

An electrical probe containing two wires was first calibrated over the conductivity range of 10 to 100,000 Hz using standard aqueous solutions of sodium chloride. Then, the electrical probe was placed in the electrolyte compositions to be measured. Ionic conductivity measurements were recorded at temperatures of 22 to 25° C. in a dry box. Results were extrapolated to 25° C. using the temperature dependence of 2.0%/° C. The results summarized in Table 2 are reported at 25° C.

TABLE 2

Ionic Conductivity of Electrolyte Compositions at 25° C.

| Electrolyte Composition | Ionic Conductivity (mS/cm) |
| --- | --- |
| Comparative Example 1 | 7.00, 6.95 |
| Example 1 | 7.65 |
| Example 2 | 8.02, 7.97, 8.24, 8.10 |
| Example 3 | 7.83 |

Electrolytes with high ionic conductivity are desired since low conductivity decreases battery performance at high rates of charging and discharging. Replacing the 20 wt % FEC in Comparative Example 1 with EC while maintaining the $LiPF_6$ salt molarity constant (Example 1) increases the conductivity from 6.98 to 7.65 mS/cm. The conductivity can be further increased to 8.08 mS/cm by changing the ratio of the two solvents from 80:20 DFEA:EC to 70:30 DFEA:EC (Example 2). Adding 1% FEC to the 70:30 DFEA:EC and 1.0 M $LiPF_6$ composition (Example 3) reduced the conductivity slightly to 7.83 mS/cm.

Working Examples 5-6, and Comparative Example 2

Figure 2:
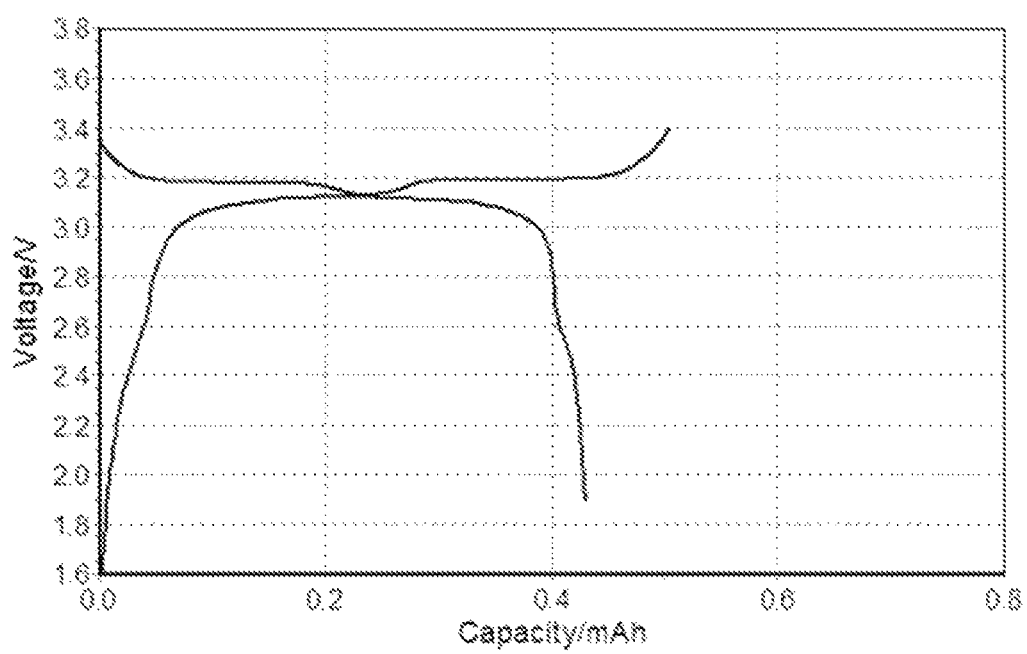
Figure 3:
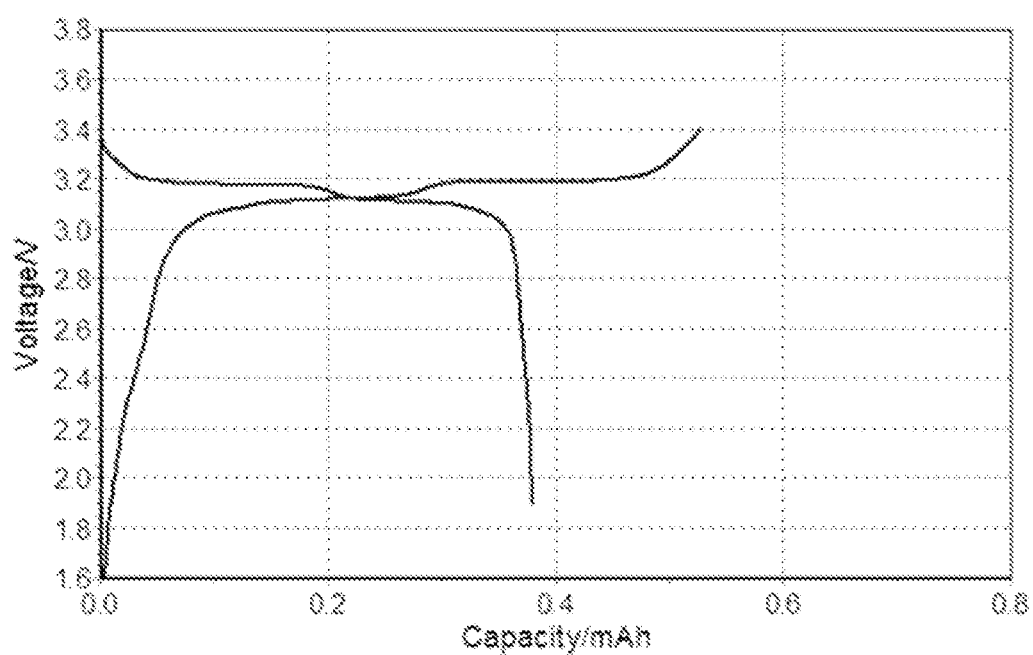

Formation Processing (Slow Cycling) of $LiMn_{1.5}Ni_{0.42}Fe_{0.08}O_4/Li_4Ti_5O_{12}$ Full Cells Lithium ion batteries are often cycled before use at a slow rate for one or more cycles, a process that is referred to as "formation". Each coin cell, prepared as described above, was first charged at 0.1 C from its open circuit voltage to 3.4 V at room temperature using a commercial battery tester (Series 4000, Maccor, Tulsa, Okla.). This was followed by discharging each cell at 0.1 C from 3.4 V to 1.9 V. The 0.1 C charge and discharge were then repeated a second time between 1.9 and 3.4 V. Results for the formation process are compiled in FIGS. 1-3 and Table 3.

The three coin cells had similar first cycle charge capacities, with the small differences attributed to variations in the cathode loadings. The first cycle discharge capacity was much lower for the 80:20 DFEA:FEC and 1.0 M $LiPF_6$ electrolyte composition (Comparative Example 2) than for the 70:30 DFEA:EC and 1.0 M $LIPF_6$ electrolyte composition (Example 5) and the 70:30 DFEA:EC, 1.0 M $LiPF_6$ and 1% FEC electrolyte composition (Example 6).

Although the general shape of the voltage vs. capacity curves was similar for charging all three cells (FIGS. 1-3), there was a notable difference in the discharge curves. Both the 70:30 DFEA:EC and 1.0 M $LIPF_6$ electrolyte composition (Example 5, FIG. 1) and the 70:30 DFEA:EC, 1.0 M $LiPF_6$ and 1% FEC electrolyte composition (Example 6, FIG. 2) yielded discharge curves in which the tail end of the capacity contained a shoulder at the 2.5 V plateau, which was also present during the charging process. This shoulder was not present for the 80:20 DFEA:FEC and 1.0 M $LiPF_6$ electrolyte composition (Comparative Example 2, FIG. 3) due to the reduced first cycle discharge capacity for this inferior electrolyte. The reduced first cycle discharge capacity also corresponds to a loss in capacity for further cycling. This is demonstrated by the lower second cycle charge and discharge capacities for the cell containing 80:20 DFEA:FEC and 1.0 M $LiPF_6$ electrolyte composition (Comparative Example 2) compared to the cells containing the other two electrolyte compositions (Examples 5 and 6), as shown in Table 3.

TABLE 3

Results of Initial Cycling of $LiMn_{1.5}Ni_{0.42}Fe_{0.08}O_4/Li_4Ti_5O_{12}$ Full Cells at C/10 and Room Temperature

| Example | Electrolyte Composition | First Cycle Charge Capacity (mAh) | First Cycle Discharge Capacity (mAh) | Second Cycle Charge Capacity (mAh) | Second Cycle Discharge Capacity (mAh) |
| --- | --- | --- | --- | --- | --- |
| 5 | Example 2 | 0.513 | 0.450 | 0.466 | 0.449 |
| 6 | Example 3 | 0.504 | 0.429 | 0.447 | 0.429 |
| Comparative 2 | Comparative Example 1 | 0.525 | 0.330 | 0.421 | 0.363 |

Working Examples 7-8, and Comparative Example 3

Cycling of $LiMn_{1.5}Ni_{0.42}Fe_{0.08}O_4/Li_4Ti_5O_{12}$ Full Cells at Elevated Temperature Following the two-cycle formation process at room temperature, each cell was cycled in a commercial battery tester (Series 4000, Maccor, Tulsa, Okla.) at 55° C. between 1.9 V and 3.4 V using a cycling protocol in which the cell was cycled at constant current at C/2 for 29 cycles followed by a single cycle at constant current at C/5. This (29×C/2+1× C/5) cycling procedure was repeated times, for a total of 300 charge-discharge cycles. As a part of the cycling protocol, the impedance at 1000 Hz was measured following the completion of each charge step and the completion of each discharge step. Results are shown in Table 4.

TABLE 4

Results of Cycling $LiMn_{1.5}Ni_{0.42}Fe_{0.08}O_4/Li_4Ti_5O_{12}$ Full Cells at 55° C.

| Example | Electrolyte Composition | Capacity Retention for Cycle No. 299 | Coulombic Efficiency for Cycle No. 299 |
| --- | --- | --- | --- |
| 7 | Example 2 | 44.4% | 99.5% |
| 8 | Example 3 | 38.0% | 98.9% |
| Comparative Example 3 | Comparative Example 1 | 7.8% | 93.0% |

The electrolyte composition containing 70:30 DFEA:EC and 1.0 M $LiPF_6$ retained 44.4% of its initial capacity after 299 cycles at 55° C. (Example 7 in Table 4). After the first 50 cycles, the Coulombic efficiency stayed above 99% for the remaining cycles at C/2 and was 99.5% for the $299^{th}$ cycle.

The electrolyte composition containing 70:30 DFEA:EC, 1.0 M LiPF$_6$ and 1% FEC retained 38.0% capacity after 299 cycles at 55° C. (Example 8 in Table 4). The Coulombic efficiency was 98.7% at the 50$^{th}$ cycle and stayed above this value for the remaining cycles at C/2, reaching a value of 98.9% at the 299$^{th}$ cycle.

The electrolyte composition containing 80:20 DFEA:FEC and 1.0 M LiPF$_6$ performed poorly in comparison to the other two electrolyte compositions that contained EC (Comparative Example 3 in Table 4). The capacity dropped quickly during the early stages of cycling, dropping below 50% by the 25$^{th}$ cycle. The capacity retention for the 299$^{th}$ cycle was 7.8%. The Coulombic efficiency was poor, never exceeding 96% for the cycles at C/2 and dropping to 93.0% by the 299$^{th}$ cycle.

In various embodiments of the lithium ion battery hereof, pairs of dopant metals and fluorinated solvent systems may be formed from (i) any one or more of all of the members of the total group of dopant metals disclosed herein (Al, Cr, Fe, Ga, Zn, Co, Nb, Mo, Ti, Zr, Mg, V and Cu), selected as described above as a single member or any subgroup of any size taken from the total group of doping metals in all the various different combinations of individual members of that total group, together with (ii) any one or more of all of the members of the total group of the fluorinated solvent systems disclosed herein, selected as described above as a single member or any subgroup of any size taken from the total group of those fluorinated solvent systems in all the various different combinations of individual members of that total group. Subgroups of the members of the groups of dopant metals or fluorinated solvents may be formed by omitting any one or more members from the respective whole groups as set forth above. As a result, the dopant metal or fluorinated solvent system (or pair thereof) may not only be the members of any subgroup of any size that may be formed from the whole group from all the various different combinations of individual members of the groups as set forth in the list above, but may also be made in the absence of the members that have been omitted from the whole group to form the subgroup. The subgroup formed by omitting various members from the whole group in the lists above may, moreover, be an individual member of the whole group such that the dopant metal or fluorinated solvent system (or pair thereof) may be selected in the absence of all other members of the whole group except the selected individual member.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage,
  (a) lists of compounds, monomers, oligomers, polymers and/or other chemical materials include derivatives of the members of the list in addition to mixtures of two or more of any of the members and/or any of their respective derivatives; and
  (b) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value.

What is claimed is:

1. An electrolyte composition comprising:
   (a) at least one electrolyte salt;
   (b) a solvent mixture comprising ethylene carbonate at a concentration of about 10% to about 50% by weight of the solvent mixture; and CH$_3$CO$_2$CH$_2$CF$_2$H at a concentration of about 50% to about 90% by weight of the solvent mixture; and
   (c) fluoroethylene carbonate at a concentration of about 0.01% to less than 2% by weight of the electrolyte composition.

2. The electrolyte composition of claim 1, wherein the electrolyte salt is selected from one or more members of the group consisting of:
   lithium hexafluorophosphate,
   LiPF$_3$(CF$_2$CF$_3$)$_3$,
   lithium bis(trifluoromethanesulfonyl)imide,
   lithium bis (perfluoroethanesulfonyl)imide,
   lithium (fluorosulfonyl) (nonafluorobutanesulfonyl)imide,
   lithium bis(fluorosulfonyl)imide,
   lithium tetrafluoroborate,
   lithium perchlorate,
   lithium hexafluoroarsenate,
   lithium trifluoromethanesulfonate,
   lithium tris (trifluoromethanesulfonyl)methide,
   lithium bis(oxalato)borate,
   lithium difluoro(oxalato)borate,
   Li$_2$B$_{12}$F$_{12-x}$H$_x$ where x is equal to 0 to 8, and
   a mixture of lithium fluoride and an anion receptor.

3. The electrolyte composition of claim 2 wherein the electrolyte salt is lithium hexafluorophosphate.

4. The electrolyte composition of claim 1, wherein the ethylene carbonate comprises about 30% by weight of the solvent mixture and the CH$_3$CO$_2$CH$_2$CF$_2$H comprises about 70% by weight of the solvent mixture.

5. The electrolyte composition of claim 1, wherein the fluoroethylene carbonate comprises about 1% by weight of the electrolyte composition.

6. An electrochemical cell comprising:
   (a) a housing;
   (b) an anode and a cathode disposed in said housing and in conductive contact with one another;
   (c) an electrolyte composition disposed in said housing and providing an ionically conductive pathway between said anode and said cathode, wherein the electrolyte composition comprises:
      (i) at least one electrolyte salt;
      (ii) a solvent mixture comprising ethylene carbonate at a concentration of about 10% to about 50% by weight of the solvent mixture; and $CH_3CO_2CH_2CF_2H$ at a concentration of about 50% to about 90% by weight of the solvent mixture; and
      (iii) fluoroethylene carbonate at a concentration of about 0.01% to less than 2% by weight of the electrolyte composition; and
   (d) a porous separator between said anode and said cathode.

7. The electrochemical cell of claim 6, wherein the ethylene carbonate comprises about 30% by weight of the solvent mixture and the $CH_3CO_2CH_2CF_2H$ comprises about 70% by weight of the solvent mixture.

8. The electrochemical cell of claim 6, wherein the fluoroethylene carbonate comprises about 1% by weight of the electrolyte composition.

9. The electrochemical cell of claim 6, wherein said electrochemical cell is a lithium ion battery.

10. An electronic device comprising an electrochemical cell according to claim 6.

* * * * *